(12) United States Patent
Bunandar (10) Patent No.: US 12,147,078 B2
(45) Date of Patent: Nov. 19, 2024

(54) POLARIZATION LOCKER FOR FIBER CONNECTIONS AND RELATED METHODS

(71) Applicant: Lightmatter, Inc., Boston, MA (US)

(72) Inventor: Darius Bunandar, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 18/504,676

(22) Filed: Nov. 8, 2023

(65) Prior Publication Data

US 2024/0159967 A1 May 16, 2024

Related U.S. Application Data

(60) Provisional application No. 63/424,807, filed on Nov. 11, 2022.

(51) Int. Cl.
*G02B 6/27* (2006.01)
*G02B 6/43* (2006.01)
*H04B 10/40* (2013.01)

(52) U.S. Cl.
CPC ............ *G02B 6/27* (2013.01); *G02B 6/43* (2013.01); *H04B 10/40* (2013.01)

(58) Field of Classification Search
CPC . G02B 6/27; G02B 6/43; G02B 6/126; H04B 10/40; H04B 10/801
See application file for complete search history.

(56) References Cited

U.S. PATENT DOCUMENTS

| 5,771,323 A | 6/1998 | Trott |
| 5,930,429 A | 7/1999 | Trott |
| 6,202,165 B1 | 3/2001 | Pine |

(Continued)

FOREIGN PATENT DOCUMENTS

| EP | 2212887 A1 | 8/2010 |
| EP | 3159721 A1 | 4/2017 |

(Continued)

OTHER PUBLICATIONS

Invitation to Pay Additional Fees dated Aug. 25, 2023, in connection with International Application No. PCT/US2023/065007.

(Continued)

*Primary Examiner* — Leslie C Pascal
(74) *Attorney, Agent, or Firm* — Wolf, Greenfield & Sacks, P.C.

(57) ABSTRACT

Photonic interconnect systems are described. A fiber connects a first photonic integrated circuit (PIC) to a second PIC. The fiber is non-polarization maintaining and as a results creates polarization drift. As a result, the polarization appearing at the output of a fiber may be different from the polarization launched at the input of the fiber. To reduce the negative effects of polarization drift, each PIC may be equipped with a polarization locker. Control circuitry is configured to control the first and second polarization lockers by setting one of the first and second polarization lockers to an active configuration and setting the other of the first and second polarization lockers to a passive configuration. Controlling the polarization lockers in this way prevents inconsistencies in polarization without having to expend additional resources that would otherwise be required to communicate the phase shift across the fiber.

19 Claims, 5 Drawing Sheets

(56) References Cited

U.S. PATENT DOCUMENTS

| | | |
|---|---|---|
| 6,477,285 B1 | 11/2002 | Shanley |
| 7,251,386 B1 | 7/2007 | Dickinson et al. |
| 7,894,699 B2 | 2/2011 | Beausoleil |
| 8,450,186 B2 | 5/2013 | Rong et al. |
| 9,671,572 B2 | 6/2017 | Decker et al. |
| 9,709,739 B1 | 7/2017 | Carpentier et al. |
| 9,922,887 B2 | 3/2018 | Vermeulen et al. |
| 10,847,467 B2 | 11/2020 | Collins et al. |
| 11,036,002 B2 | 6/2021 | Harris et al. |
| 11,754,783 B2 | 9/2023 | Harris et al. |
| 2002/0028045 A1 | 3/2002 | Yoshimura et al. |
| 2004/0258408 A1 | 12/2004 | Ramaswami et al. |
| 2007/0280585 A1 | 12/2007 | Warashina et al. |
| 2008/0044128 A1 | 2/2008 | Kish, Jr. et al. |
| 2008/0089640 A1 | 4/2008 | Beausoleil |
| 2009/0103345 A1 | 4/2009 | Mclaren et al. |
| 2009/0103855 A1 | 4/2009 | Binkert et al. |
| 2010/0054671 A1 | 3/2010 | Ban et al. |
| 2011/0052120 A1 | 3/2011 | Tan et al. |
| 2011/0073989 A1 | 3/2011 | Rong et al. |
| 2011/0128790 A1 | 6/2011 | Sarin et al. |
| 2011/0269456 A1 | 11/2011 | Krishnaswamy et al. |
| 2012/0149148 A1 | 6/2012 | Dallesasse et al. |
| 2012/0177381 A1 | 7/2012 | Dobbelaere et al. |
| 2013/0051725 A1 | 2/2013 | Shinoda et al. |
| 2013/0071121 A1 | 3/2013 | Sharapov et al. |
| 2013/0209112 A1 | 8/2013 | Witzens |
| 2013/0292840 A1 | 11/2013 | Shoemaker et al. |
| 2013/0308893 A1 | 11/2013 | Zuffada et al. |
| 2014/0040698 A1 | 2/2014 | Loh et al. |
| 2014/0043050 A1 | 2/2014 | Stone et al. |
| 2014/0264400 A1 | 9/2014 | Lipson et al. |
| 2014/0268980 A1 | 9/2014 | Kim et al. |
| 2014/0363124 A1 | 12/2014 | Pelley et al. |
| 2014/0363172 A1 | 12/2014 | Pelley et al. |
| 2016/0072586 A1* | 3/2016 | Hochberg .......... H04Q 11/0005 398/136 |
| 2016/0085038 A1 | 3/2016 | Decker et al. |
| 2016/0181322 A1 | 6/2016 | Mazed et al. |
| 2016/0191188 A1 | 6/2016 | Butler |
| 2016/0216445 A1 | 7/2016 | Thacker et al. |
| 2016/0252688 A1 | 9/2016 | Barwicz et al. |
| 2017/0108655 A1 | 4/2017 | Zarbock et al. |
| 2017/0160474 A1 | 6/2017 | Mahmoodian et al. |
| 2017/0194309 A1 | 7/2017 | Evans et al. |
| 2018/0217468 A1 | 8/2018 | Wen et al. |
| 2019/0162901 A1 | 5/2019 | Yu et al. |
| 2019/0171029 A1 | 6/2019 | Urata et al. |
| 2019/0335252 A1 | 10/2019 | Ryan |
| 2020/0111720 A1 | 4/2020 | Wan et al. |
| 2020/0284981 A1 | 9/2020 | Harris et al. |
| 2021/0118853 A1 | 4/2021 | Harris et al. |
| 2021/0278590 A1 | 9/2021 | Harris et al. |
| 2022/0109075 A1 | 4/2022 | Byrd et al. |
| 2023/0085268 A1 | 3/2023 | Harris et al. |
| 2023/0114842 A1 | 4/2023 | Harris et al. |
| 2023/0114847 A1 | 4/2023 | Harris et al. |
| 2023/0314742 A1 | 10/2023 | Dorta-Quinones et al. |

FOREIGN PATENT DOCUMENTS

| | | |
|---|---|---|
| JP | 2005502127 A | 1/2005 |
| JP | 2011503760 A | 1/2011 |
| JP | 2015062027 A | 4/2015 |
| JP | 2018506072 A | 3/2018 |
| JP | 2018093007 A | 6/2018 |
| JP | 2018195723 A | 12/2018 |
| TW | 508834 B | 11/2002 |
| WO | WO 2011/143548 A2 | 11/2011 |
| WO | WO 2016/008771 A1 | 1/2016 |

OTHER PUBLICATIONS

International Search Report and Written Opinion mailed Jul. 6, 2020, in connection with International Application No. PCT/US2020/021209.

International Preliminary Report on Patentability mailed Sep. 16, 2021, in connection with International Application No. PCT/US2020/021209.

International Search Report and Written Opinion mailed Jan. 18, 2023, in connection with International Application No. PCT/US2022/046379.

International Search Report and Written Opinion dated Jan. 26, 2023, in connection with International Application No. PCT/US2022/043209.

Invitation to Pay Additional Fees mailed May 1, 2020, in connection with International Application No. PCT/US2020/021209.

Invitation to Pay Additional Fees mailed Nov. 7, 2022, in connection with International Application No. PCT/US2022/043209.

Extended European Search Report dated Nov. 4, 2022, in connection with International Application No. PCT/US2022/043209.

Beausoleil et al., Nanoelectronics and nanophotonic interconnect. Proceedings of the IEEE. Feb. 2008;96(2):230-47. doi:10.1109/JPROC.2007.911057.

Fujikata et al., LSI on-chip optical interconnection with Si nanophotonics. Extended Abstracts of the 2007 International conference on Solid State Devices and Materials. 2007. pp. 276-277.

Grigalunas, Tell me—What is Wafer Dicing? Eastern States Components, LLC. Sep. 26, 2017. 2 pages. URL:https://www.escomponents.com/blog/2017/9/26/tell-me-what-is-wafter-dicing.

Udipi et al., Combining memory and a controller with photonics through 3D-stacking to enable scalable and energy-efficient systems. 38th Annual International Symposiums on Computer Architecture (ISCA). Jun. 8, 2011;425-436.

Wada, Electronics and Photonoics Convergence on Si CMOS Platform. Proc.of SPIE.2004;5357:16-24.

Young et al., Optical technology for energy efficient I/O in high performance computing. IEEE Communications Magazine. Oct. 2010; 48:184-91.

PCT/US2022/043209, Jan. 26, 2023, International Search Report and Written Opinion.

PCT/US2022/043209, Nov. 7, 2022, Invitation to Pay Additional Fees.

PCT/US2022/043209, Nov. 4, 2022, Extended European Search Report.

PCT/US2023/065007, Aug. 25, 2023, Invitation to Pay Additional Fees.

PCT/US2020/021209, Jul. 6, 2020, International Search Report and Written Opinion.

PCT/US2020/021209, Sep. 16, 2021, International Preliminary Report on Patentability.

PCT/US2022/046379, Jan. 18, 2023, International Search Report and Written Opinion.

PCT/US2020/021209, May 1, 2020, Invitation to Pay Additional Fees.

International Search Report and Written Opinion dated Mar. 24, 2024, in connection with International Application No. PCT/US23/79208.

* cited by examiner

POLARIZATION LOCKER FOR FIBER CONNECTIONS AND RELATED METHODS

RELATED APPLICATIONS

This Application claims the benefit under 35 U.S.C. § 119(e) of U.S. Provisional Application Ser. No. 63/424,807, filed on Nov. 11, 2022, entitled "CO-PACKAGED OPTICS, ACTIVE INTERPOSER, AND CHIPLET PACKAGING SOLUTION," which is hereby incorporated herein by reference in its entirety.

BACKGROUND

Computer systems include random-access memories (RAM) for storing data and machine code. RAMs are typically volatile memories, such that the stored information is lost when power is removed. In modern implementations, memories take the form of integrated circuits. Each integrated circuit includes several memory cells. To enable access to stored data and machine code, memories are placed in electrical communication with processors. Typically, these electrical communications are implemented as metal traces formed on the substrates on which the memories and the processors are disposed.

SUMMARY OF THE DISCLOSURE

Some embodiments relate to a photonic interconnect system comprising a photonic integrated circuit (PIC) comprising a first polarization locker; a second PIC comprising a second polarization locker; an optical fiber configured to optically couple the first and second PICs to one another bi-directionally; and control circuitry configured to control the first and second polarization lockers, wherein controlling the first and second polarization lockers comprises: setting one of the first and second polarization lockers to an active configuration and the other of the first and second polarization lockers to a passive configuration.

Some embodiments relate to a method for the photonic interconnection of photonic integrated circuits (PIC), the method comprising: transmitting through an optical fiber, an optical signal between a first PIC comprising a first polarization locker and a second PIC comprising a second polarization locker; and controlling, using control circuitry, the first and second polarization lockers by setting one of the first and second polarization lockers to an active configuration and setting the other of the first and second polarization lockers to a passive configuration.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

The inventors have recognized and appreciated several challenges that limit the scalability of modern digital computing. First, current designs are power-limited. The trend in modern computing leads to ever increasing power consumption, which limits its scalability. Additionally, the power-hungry nature of modern chips lead to hot spots of high temperature, often in excess of 100° C. High temperature limits the performance of computers substantially. Second, modern computing architectures are bandwidth-limited. These architectures rely on multiple memory chips to provide the hundreds of gigabytes or terabytes of capacity required by modern applications. Unfortunately, providing connectivity among the several memory chips is challenging. The physical space available on a board or a rack to accommodate the interconnects is limited, thus limiting the overall bandwidth. Additionally, maintaining coherence and consistency across several memory chips (e.g., memory-memory and processor-memory) is difficult to achieve. Some architectures rely on Peripheral Component Interconnect (PCI), Compute Express Link (CXL), or Ethernet for inter-chip communication. However, these interfaces involve board-level or rack-level communication, which increases power usage and reduces bandwidth. Wafer-scale electrical communication has also been explored, but this approach suffers from reliability issues and power inefficiency.

The inventors have developed photonic interposers that enable low-power, high-bandwidth inter-chip (e.g., board-level and/or rack-level) as well as intra-chip communication. The photonic interposers may be used to interconnect application-specific integrated circuits (ASIC) in ways that would otherwise be impractical (e.g., too costly or energy inefficient) using conventional interfaces. Conventional electronic interposers are designed for high-bandwidth between electronic ASICs positioned in relatively close proximity, e.g., a few millimeters apart. The relatively close proximity set by these conventional die-to-die (D2D) interfaces poses a practical limit to the types of computing architectures achievable using these interfaces. The maximum die-to-die distance set by these interfaces—a few millimeters at most—guarantees high bandwidth and reliability given the constraints of electrical interconnects. Photonic interposers can expand the applicability of conventional D2D interfaces to greater ASIC-to-ASIC distances than what is possible with conventional electronic interposers.

Some architectures involve several interposers connected together via fiber optics, where each interposer can host various types of ASICs (e.g., controllers, processors, memories, etc.) Multi-interposer architectures enable computer networks that go beyond (in terms of computational capacity) what can be achieved with a single interposer. However, the inventors have recognized and appreciated a challenge associated with implementing multi-interposer architectures. Optical fibers used to facilitate interposer-to-interposer optical connection are non-polarization maintaining and create polarization drift. An optical fiber connected to a photonic interposer may be subject to different stresses, bends, and twists as an optical signal propagates through the fiber. The stresses and bends may change over time with changes in environmental conditions. The stresses and bends may be greater or more susceptible to environmental conditions when the fiber is longer. As the optical signal propagates through the fiber, the stresses, bends, twists, and imperfections in the optical fiber may change the polarization of the optical signal. As a result, the polarization appearing at the output of a fiber may be different from the polarization launched at the input of the fiber. Additionally, the polarization may be unpredictable. This poses a challenge in that, as discussed below, different polarizations behave differently when propagating within a photonic integrated substrate of the types of the interposers described herein.

An optical signal may be viewed as the superposition of multiple polarization modes. For example, in a single mode optical fiber, the $TEM_{00}$ mode may have two orthogonally polarized components. Coupling a signal into a single mode fiber that is linearly polarized in one axis does not guarantee that the polarization in maintained as the signal travels along the fiber. Similarly, optical signal traveling inside photonic integrated circuits may also be viewed as the superposition of multiple polarizations modes. For example, silicon-based optical waveguides can exhibit a transverse electric (TE) mode (where the electric field is substantially orthogonal to the direction of propagation) and a transverse magnetic (TM) mode (where the magnetic field is substantially orthogonal to the direction of propagation).

When an optical signal is coupled from an optical fiber to an integrated optical waveguide (e.g., the waveguide of a photonic interposer), the non-polarization maintaining nature of the fiber results in a signal in the waveguide that is a combination of a TE mode and a TM mode—with unpredictable proportions. This can negatively affect the performance of a PIC because, in general, TM modes are substantially more lossy than TE modes. This is due to the fact that TE modes are more spatially confined than TM modes, resulting in less optical loss due to sidewall scattering. As a result, more optical loss arises than would be the case if only the TE mode were excited. Additionally, because the proportion between the power coupled to the TE mode and the power coupled to the TM mode is unpredictable, the optical loss is also unpredictable, making it more challenging to allocate a reasonable amount power that satisfies the system power budget. Lastly, the presence of TM modes can result in undesirable resonant peaks. Resonant structures (e.g., micro-rings) are often used in a photonic integrated circuit as building blocks to form modulators, filters and other types of devices. These devices are typically designed to operate in the TE mode, and to avoid the TM mode. This is because the low-loss nature of TE modes results in narrower resonant peaks than would be possible with TM modes. Narrower resonant peaks are generally favorable in that they allow finer spectral resolutions (e.g., finer wavelength divisional multiplexing or WDM). The generation of TM resonance can negatively impact the ability of a resonant structure to perform fine spectral operations.

The inventors have developed a photonic interconnect system and related methods that minimize power loss and other undesired effects caused by polarization drift. The photonic interconnect system and related methods described herein involve polarization locking, a technique aimed at transforming the TM component of an incoming optical signal to TE, regardless of the TE/TM composition of the incoming signal. For example, an incoming signal that as a result of polarization drift has 50% of its power in the TE mode and 50% in the TM mode, upon polarization locking, is transformed into an incoming signal having 100% (or as close to 100% as possible, depending on other system constraints) of its power in the TE mode.

A polarization locker may comprise, among other components, a polarization splitter and a mode converter. The polarization splitter may split an incoming optical signal into a TE mode and a TM mode. The TM mode may follow a first path while the TE mode follows a second path. The TM mode may be converted to a converted TE mode in the mode converter along the first path. In some embodiments, the TE mode may be delayed by a delay unit along the second path of the polarization locker to maintain temporal alignment of the TE mode with the converted TE mode.

In some embodiments, the polarization locker may comprise a phase shifter along one or both of the first and second paths. Controlling the polarization lockers may comprise controlling the phase shifter or phase shifters of the polarization locker to align the TE mode and the converted TE mode in the same phase. The phase shifter may utilize a number of different physics: thermo-optic, micro-electromechanical/nano-electromechanical, carrier effects through the use of p-n or p-i-n junction, chi(2) or chi(3) in media with optical nonlinearities. The polarization locker may further comprise an optical coupler to couple the TE mode and converted TE mode and provide an output optical signal. The control circuitry may control the phase shifter to maximize the output optical signal.

In some embodiments, the PIC receiving the optical signal may comprise a receiver to receive the output optical signal. The output optical signal may create a photocurrent in the receiver. Maximizing the output optical may comprise maximizing the photocurrent in the receiver. In some embodiments, the receiver may provide a feedback signal to the control circuitry indicative of the photocurrent in the receiver. The control circuitry may adjust the phase shifter in response to the feedback signal until the photocurrent in the receiver is maximized.

In other embodiments, if the PIC receiving the optical signal aims to maximize the optical signal in a certain polarization, e.g., TE mode, the PIC may use a monitoring photodetector on the optical signal to measure a signal that signifies the orthogonal polarization, e.g., the output of the rotated TM mode of a polarization splitter-rotator. The PIC may use this signal as a feedback signal-minimizing the TM mode output to maximize the TE mode output.

The inventors have further recognized and appreciated challenges in implementing the photonic interconnect system for applications requiring bi-directional signaling between two PICs. In these applications, a fiber attached to two PICs can support signal propagation in either direction, depending on which PIC acts as a transmitter and which PIC acts as the receiver. Designing an optical network so that fibers can support propagation in either direction is desirable in that it reduces the overall number of fibers in the network. Given the non-polarization-maintaining nature of the fiber, polarization locking should be performed on both ends of the fiber.

In some embodiments, the two PICs may each include an edge coupler or other suitable chip-to-fiber couplers (e.g., vertical grating couplers, evanescent couplers, etc.) to connect each PIC to the fiber. The edge couplers may have unbalanced loss. For example, the TM mode may be more lossy than the TE mode. Further, long optical fibers also have polarization-dependent loss, where certain polarization modes experience higher loss than the others. It may be advantageous to use two polarization lockers, one on the transmitter chip and another on the receiver chip. The transmitter chip may ensure that the polarization of the light is optimized to minimize loss after accounting for the edge couplers and the travel along the long optical fiber. The receiver chip may then convert the polarization to the guided polarization mode in its chip. In some embodiments, the guided polarization mode may be the TE mode.

However, the inventors have appreciated that simultaneously controlling both of the polarization lockers that lie on opposite ends of a fiber may lead to discrepancies between the polarization state of one PIC and the polarization state in the other PIC, which can lead to further optical power loss. Those discrepancies may be limited by allowing each polarization controller to communicate its polarization state to the other controller, so that the polarization lockers can deliberately align to each other. However, allowing the polarization lockers to do this results in significant expenditures of computational resources.

In the interest of reducing polarization discrepancies without having to communicate the polarization state across the fiber, the inventors propose setting the polarization locker on one end of the fiber to an active configuration while setting the polarization locker on the other end of the fiber to a passive configuration. For example, only the polarization locker on the receiving end of the fiber may be activated, while the polarization locker on the transmitting end may remain passive.

In some embodiments, the photonic interconnect system may enable wavelength-division multiplexing bidirectional communication. In some embodiments, both communicating chips may be using the same output arm of the polarization locker to send and receive data simultaneously at different wavelengths. One chip may be using a wavelength set A ($\lambda_1, \lambda_3, \ldots, \lambda_{2N+1}$) to send data to the other communicating chip. The other chip may be using the wavelength set B ($\lambda_2, \lambda_4, \ldots, \lambda_{2N}$) to send data to the former chip. The polarization lockers may be used to ensure that data from one chip, which was encoded in that chip's TE mode, will arrive to the other chip's TE mode. The wavelength sets A and B may be even and odd wavelengths, where neighboring wavelengths are sufficiently spaced apart by 100 GHz, 200 GHz, or 400 GHz. In other embodiments, the wavelength set A may be the first N wavelengths while wavelength set B may be the second N wavelengths. In some embodiments, the wavelength multiplexing may be performed with the aid of a wavelength interleaver, which may be a series of asymmetric Mach Zehnder interferometers (MZIs), ring-assisted MZIs, or wavelength-resonant structures, e.g., rings, disks, or resonators.

In some embodiments, the active configuration comprises controlling the polarization locker as described herein to increase (e.g., to maximize) the output optical signal. This may be performed using a feedback loop. By contrast, the passive configuration may let the optical signal pass as if the polarization locker were a passive waveguide or optical fiber. For example, the phase shifter(s) of a polarization locker may not be driven when the polarization locker is set to the passive configuration, or may be driven but not in a way that increases (e.g., maximizes) the output.

It should be noted that although polarization-maintaining fibers exist and are commercially available, these types of fibers are significantly more expensive than their non polarization-maintaining counterparts. The increased cost of polarization-maintaining fibers is primarily due to the additional manufacturing processes and materials required to create fibers that can maintain the polarization state of light. The production of polarization-maintaining fibers involves precise design and fabrication techniques to induce birefringence, which is essential for preserving polarization. These techniques can include non-circular core designs, stress-inducing elements, and specialized coatings. Additionally, the quality control and testing processes for polarization-maintaining fibers are more stringent to ensure that they meet the polarization-preserving specifications.

The inventors have recognized and appreciated that it is more economical to handle polarization on-chip using the techniques described herein than using polarization-maintaining fibers.

Figure 1:
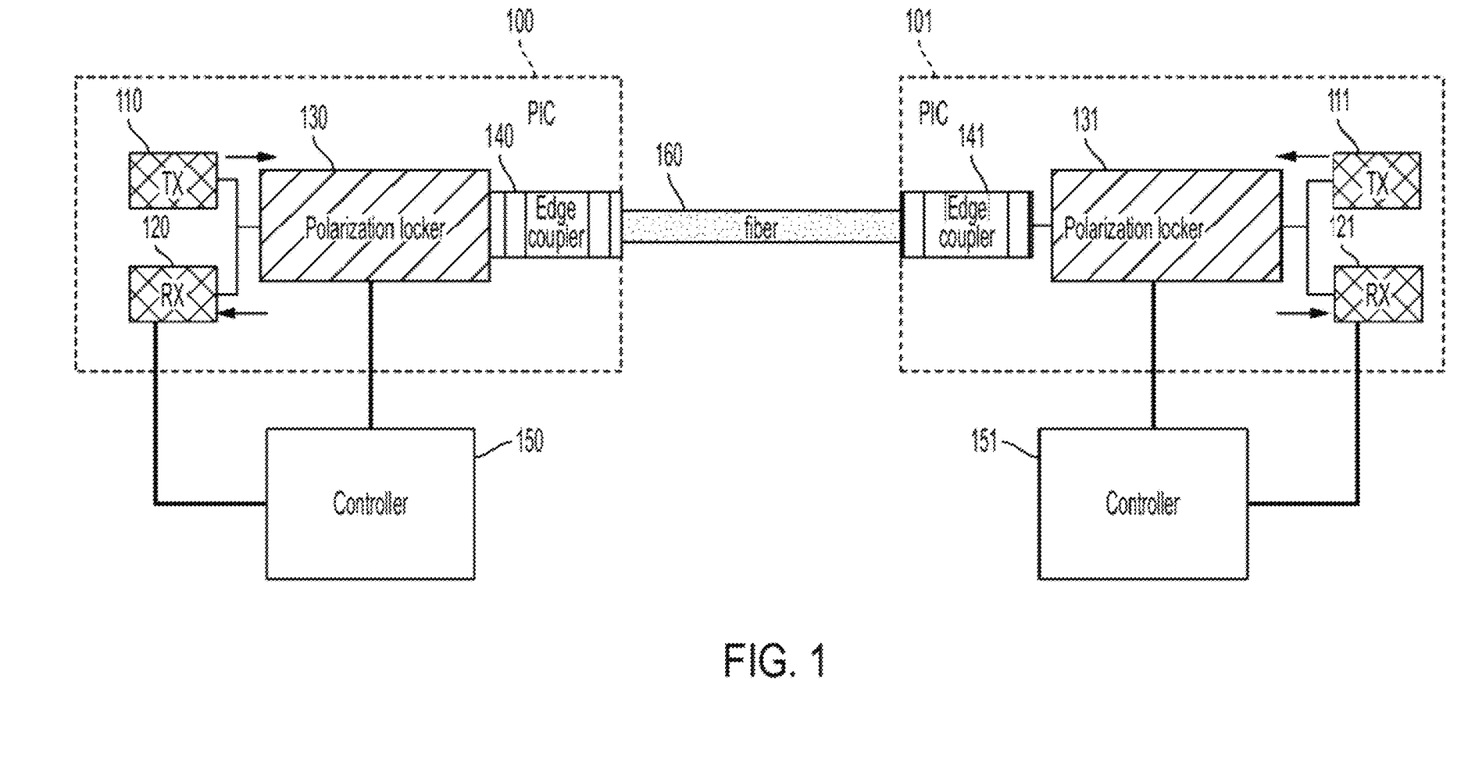
FIG. 1 illustrates a photonic interconnect system, in accordance with some embodiments.

FIG. 1 illustrates a photonic interconnect system, according to some embodiments. The photonic interconnect system may comprise a first PIC 100 and second PIC 101. PIC 100 may comprise a transmitter 110, a receiver 120, and a polarization locker 130. In some embodiments, PIC 100 may comprise an edge coupler 140 to couple PIC 100 to optical fiber 160. PIC 101 may comprise a transmitter 111, a receiver 121, and a polarization locker 131. In some embodiments, PIC 101 may comprise an edge coupler 141 to couple PIC 101 to optical fiber 160. Optical fiber may comprise two channels, one configured to support propagation of optical signals in a first direction and the other configured to support propagation of optical signals in a second direction opposite the first direction. In some embodiments, optical fiber 160 may be a single mode optical fiber. In some embodiments, optical fiber 160 may be replaced with an optical waveguide or other suitable component. In some embodiments, optical fiber 160 may be coupled to PIC 100 and PIC 101 through other suitable chip-to-fiber couplers (e.g., vertical grating couplers, evanescent couplers, etc.) rather than edge couplers 140 and 141.

The photonic interconnect system may further comprise control circuitry. The control circuitry may comprise controllers 150 and 151 coupled to their respective PICs as depicted in FIG. 1. It should be noted that controllers 150 and 151 may be part of the same device (e.g., a common ASIC) or may be independent devices. Controller 150 may be configured to control polarization locker 130. Controller 150 may set polarization locker 130 to a passive configuration when an optical signal is transmitted in a first direction from transmitter 110 to receiver 121. Controller 150 may further set polarization locker 130 to an active configuration when an optical signal is transmitted in a second direction from transmitter 111 to receiver 120. Controller 150 may be further configured to receive a feedback signal from receiver 120 to adjust the control of polarization locker 130 to increase (e.g., maximize) an output optical signal to receiver 120.

Similarly, controller 151 may be configured to control polarization locker 131. Controller 151 may set polarization locker 131 to an active configuration when PIC 101 acts as the receiver and set polarization locker 131 to a passive configuration when PIC 101 acts as the transmitter. As for controller 150, controller 151 may be further configured to receive a feedback signal from receiver 121 to adjust the control of polarization locker 131 to maximize an output optical signal to receiver 121. In some embodiments, the feedback signals received from receivers 120 and 121 may be indicative of the polarization of the signal coupled to the PIC from the fiber. For example, an RX that produces a higher photocurrent may indicate that the signal has a greater TE component (relative to the TM component) than an RX that produces a lower photocurrent.

The inventors have appreciated that setting one of polarization lockers 130 and 131 to an active configuration while at the same time setting the other of polarization lockers 130 and 131 to a passive configuration may simplify the control of the photonic interconnect system in that it avoids having to communicate the phase shift applied to each polarization locker to the other polarization locker. Focusing the control on only one of polarization lockers 130 and 131 is advantageous in that it prevents inconsistencies between the polarization lockers without having to expend additional resources that would otherwise be required to communicate the phase shift across the fiber. Activating both polarization lockers at the same time would require that the polarization lockers be aligned to one another in a coordinated fashion, otherwise a loss of power would occur. Power loss due to polarization misalignment between the polarization lockers may be prevented by leaving one of the polarization lockers in the passive configuration while activating the other. In some embodiments, only the polarization locker that is on the receive side of the fiber is activated.

Figure 2:
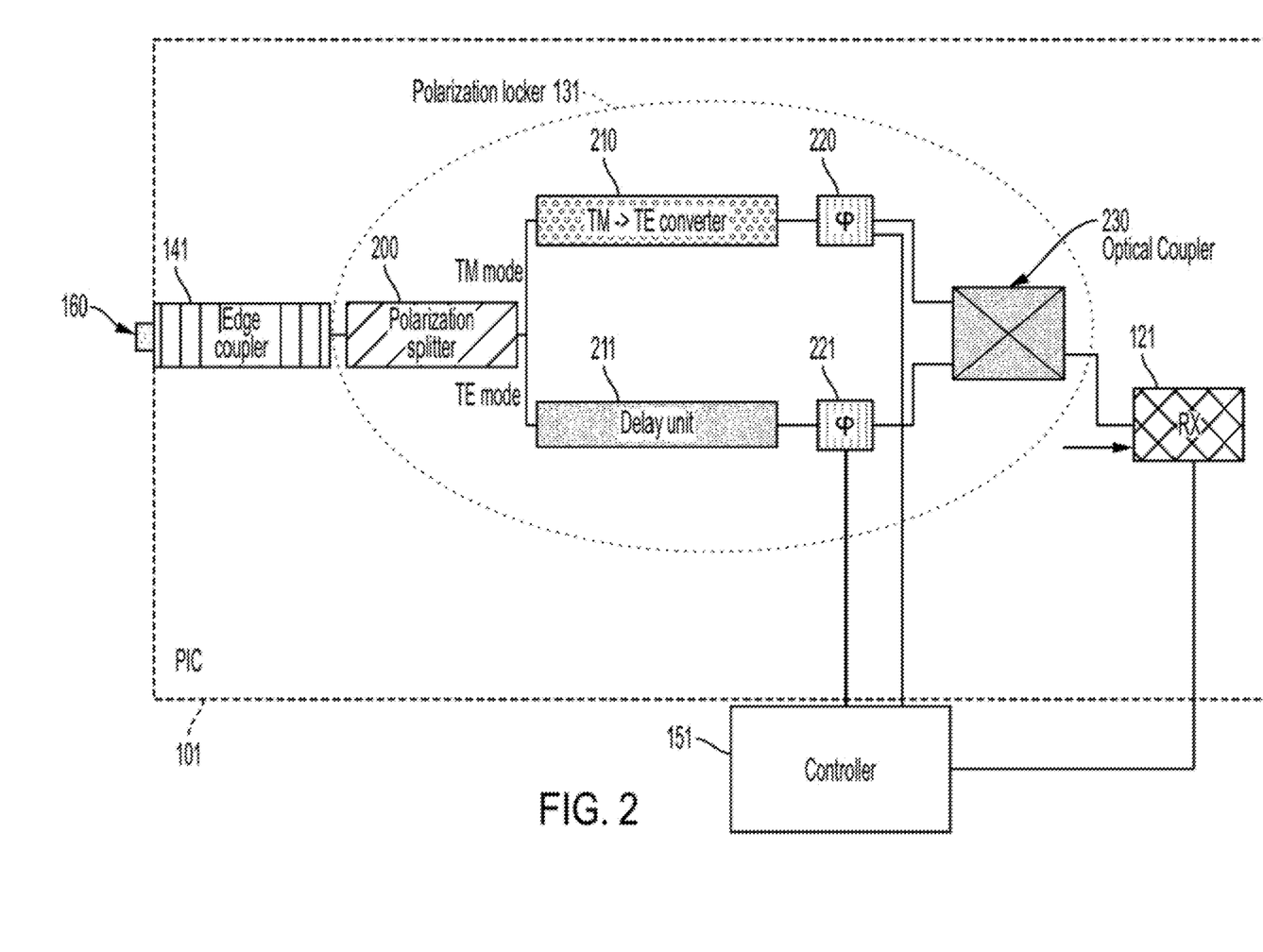
FIG. 2 illustrates a photonic integrated circuit (PIC) of the photonic interconnect system, in accordance with some embodiments.

FIG. 2 illustrates a PIC 101 in more detail, according to some embodiments. Although not illustrated in FIG. 2, PIC 100 may be arranged in a similar fashion. FIG. 2 depicts polarization locker 131 comprising a polarization splitter 200, TM-to-TE converter 210, delay unit 211, phase shifters 220 and 221, and optical coupler 230. Polarization splitter 200 splits an optical incoming signal received from fiber 160 into a first mode and second mode, e.g., a TE mode and a TM mode. The first mode may pass through a first arm of polarization locker 131 to delay unit 211 and the second mode may pass through a second arm of polarization locker 131 to mode converter 210. Mode converter 210 converts the TM mode of the optical signal to a TM mode. Delay unit 211 may be configured to temporally align the TE mode with the converted TE mode by matching the delay introduced by converter 210.

In some embodiments, both the first and second arm of the polarization locker may comprise a phase shifter 220 or 221. It can be appreciated that in some embodiments, only one of phase shifter 220 and 221 may be present. Phase shifters 220 and 221 may be configured to adjust the phases of the first mode and the converted first mode to align their respective phases to one another. Optical coupler 230 may be configured to couple the first mode with the converted first mode to produce an output optical signal comprising a combination of the first mode and converted first mode. In some embodiments, optical coupler 230 may be a directional coupler or may be a MZI. In some embodiments, the MZI may make use of p-n or p-i-n junction, or thermo-optic heater, or MEMS/NOEMS, or a combination of these phase-shifter technologies to handle different bandwidths of polarization scrambling aggressors. For example, faster phase shifters, e.g., p-n or p-i-n junction, can be used to correct polarization scrambling that occurs up to GHz bandwidth while slower phase shifters can be used to tune polarization at the kHz to MHz regimes. In the active configuration, controller 151 drives the phase shifters (whether one or both) on the basis of a feedback signal to increase (e.g., maximize) the output.

Receiver 121 receives the output optical signal from polarization locker 131 and produces a photocurrent. Controller 151 may be further configured to receive a feedback signal from receiver 121 indicative of the photocurrent (e.g., a digitized version of the photocurrent). Controlling phase shifters 220 and 221 to maximize an output signal may comprise adjusting the phase shifters 220 and 221 responsive to the feedback signal received from receiver 121 to maximize the photocurrent.

By contrast, when polarization locker 131 is in the passive configuration, controller 151 does not drive neither one of the phase shifters. In other words, the phase shifters behave as passive waveguides. Alternatively, in the passive configuration, controller 151 does drive either one of the phase shifters, but not in a way that increases (e.g., maximizes) the output.

Figure 3:
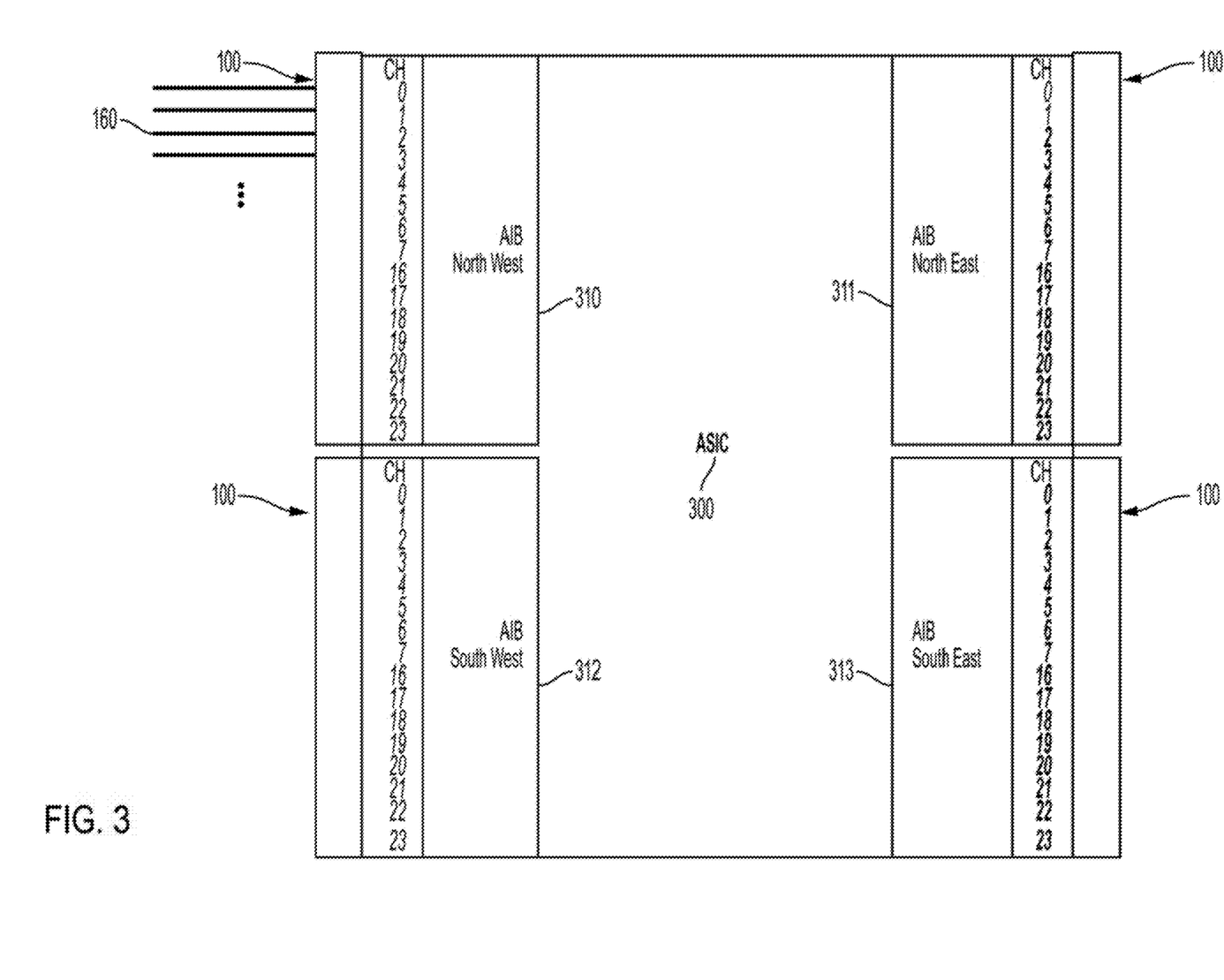
FIG. 3 illustrates an application specific integrated circuit (ASIC) having an Advanced Interface Bus (AIB) interface implementing photonic interconnect systems, in accordance with some embodiments.

It can be appreciated that the photonic interconnect system and related methods described herein may be used to optically interconnect ASICs. FIG. 3 illustrates an example ASIC implementing a photonic interconnect system described herein. ASIC 300 may comprise a plurality of die-to-die (D2D) interfaces 310-313. In some embodiments, the D2D interfaces 310-313 may be AIB interfaces. In some embodiments, the D2D interfaces may be UCIe interfaces. In some embodiments, the D2D interfaces may be BoW interfaces. D2D interfaces 310-313 may be configured to support a plurality of channels. Each D2D interface may be coupled to a plurality of photonic interconnect systems. For clarity, only PICs 100 and optical fibers 160 are shown in FIG. 3. PICs 100 may be implemented in the same manner as any embodiment described herein. It can be appreciated that ASIC 300 may be optically coupled to a second ASIC at a variety distances. In some embodiments, the second ASIC may be on the same chip. In other embodiments, the second ASIC may be on the same circuit board.

Figure 4:
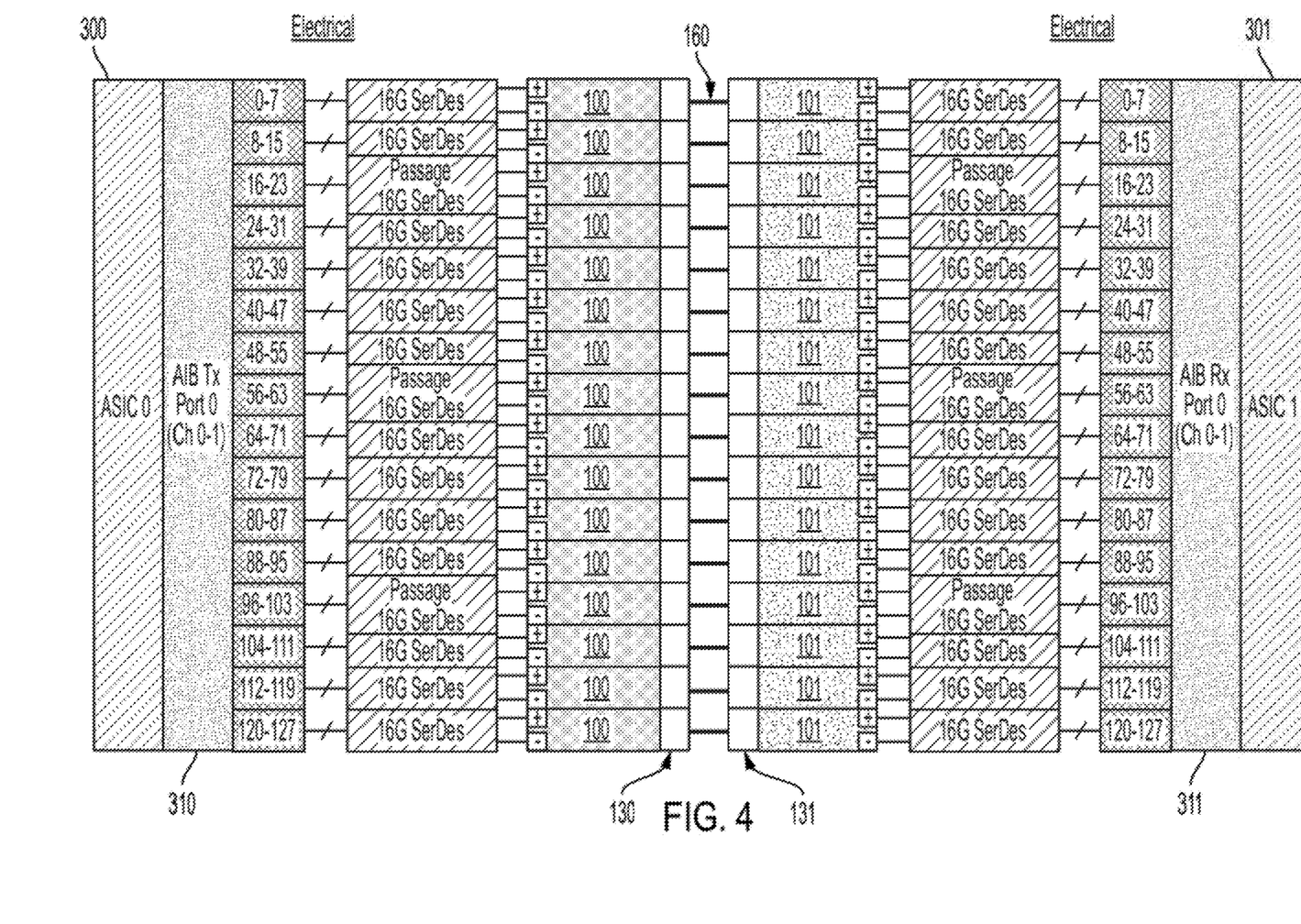
FIG. 4 illustrates ASIC-to-ASIC connections using an AIB interface and a photonic interconnect system, in accordance with some embodiments.

FIG. 4 illustrates an ASIC-to-ASIC connection using AIB interfaces and a photonic interconnect system, according to some embodiments. ASIC 300 may be coupled AIB 310. AIB 310 may comprise a plurality of wires which connect to a plurality of SerDes. The plurality of SerDes may be coupled to a plurality of PICs 100 each comprising a polarization locker 130. Each PIC 100 may further comprise a transmitter 110 configured to convert an electrical signal from the SerDes into an optical signal and transmit the optical signal in the first direction. PICs 100 may each further comprise a receiver 120 configured to receive an optical signal from the second direction and convert the optical signal to an electrical signal. In some embodiments, transmitter 110 may be an optical modulator and receiver 120 may be an optical detector.

ASIC 300 may be optically coupled to ASIC 301 by optical fibers 160. ASIC 301 may be implemented in the same manner as ASIC 300. ASIC 301 may be coupled to a plurality of PICs 101 each comprising a polarization locker 131. PICs 101 may further comprise a transmitter 111 configured to convert an electrical signal from a plurality of SerDes into an optical signal and transmit the optical signal in the second direction and a receiver 121 configured to receive an optical signal from the first direction and convert the optical signal to an electrical signal. In some embodiments, transmitter 111 may be an optical modulator and receiver 121 may be an optical detector.

Unlike conventional electronic interposers and interconnect systems, the photonic interconnect system can optical interconnect ASICs over a wide range of distances. As such, it can be appreciated that ASIC 300 may be optically coupled to a second ASIC at a variety distances. In some embodiments, the second ASIC may be on the same chip. In other embodiments, the second ASIC may be on the same circuit board. In some embodiments, the ASIC-to-ASIC distance may be greater than 2.5 cm.

Figure 5:
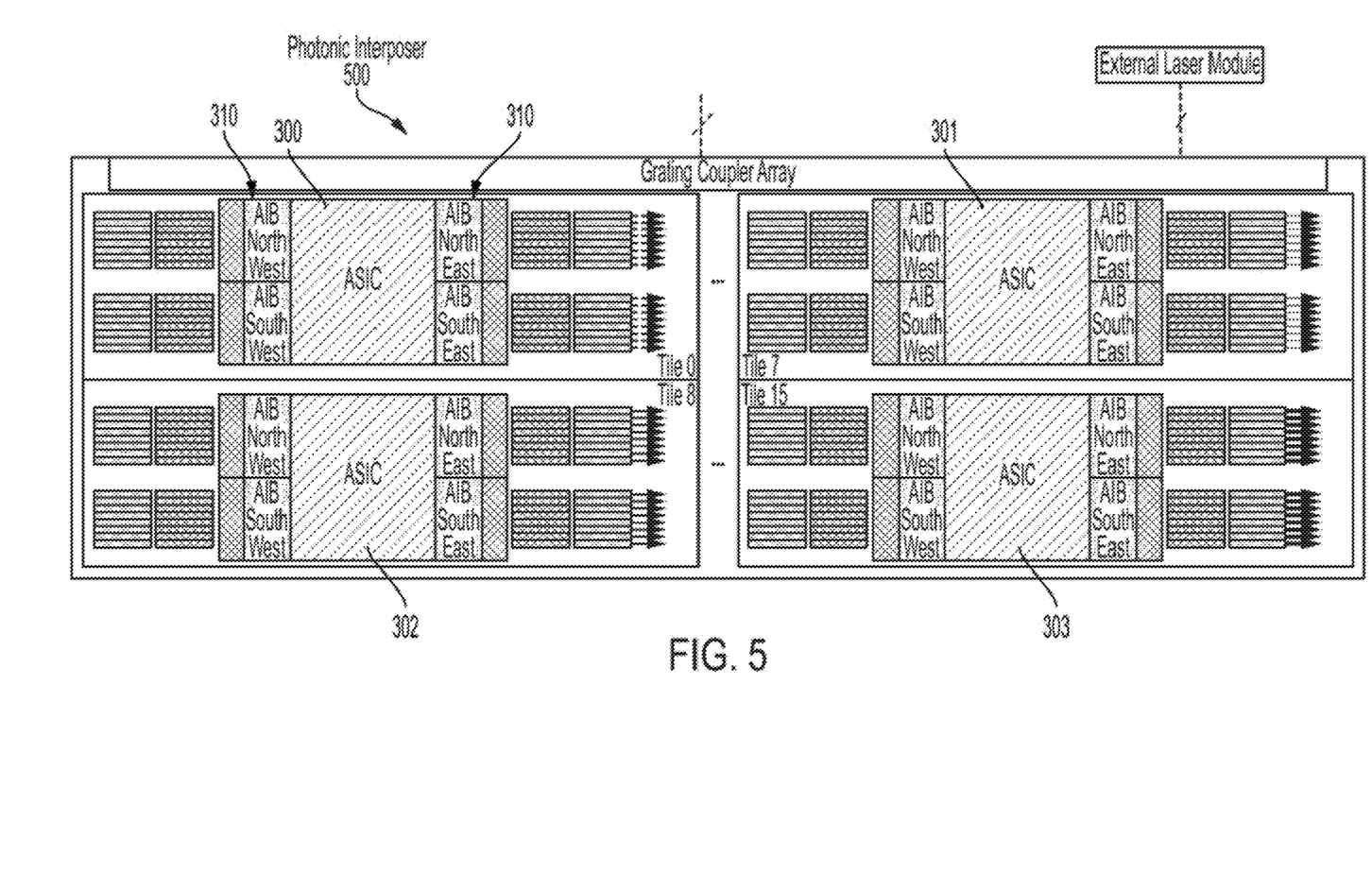
FIG. 5 illustrates a photonic interposer hosting multiple ASICs in communication with each other via AIB interfaces, in accordance with some embodiments.

FIG. 5 illustrates a photonic interposer hosting multiple ASICs implementing AIB interfaces, according to some embodiments. Photonic interposer 500 hosts a plurality of ASICs 300-303. Each ASIC 300-303 implement a plurality of D2D interfaces 310. It can be appreciated that photonic interconnection ASICs 300-304 can be implemented according to any of the embodiments described herein, for example, according to the embodiment depicted in FIG. 4.

It can be further appreciated that ASICs 300-303 may be connected using the photonic interconnect systems described herein to ASICs on a separate photonic interposer, on a separate chip, on a separate circuit board, or at a particular distance, for example, greater than 2.5 cm.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic interconnect system comprising:
    a first photonic integrated circuit (PIC) comprising a first polarization locker;
    a second PIC comprising a second polarization locker;
    an optical fiber configured to optically couple the first and second PICs to one another bi-directionally; and
    control circuitry configured to control the first and second polarization lockers, wherein controlling the first and second polarization lockers comprises:
        setting one of the first and second polarization lockers to an active configuration while setting the other of the first and second polarization lockers to a passive configuration.

2. The photonic interconnect system of claim 1, wherein:
    the first and second polarization lockers each comprise a polarization splitter, a mode converter, and a phase shifter; and
    setting one of the first and second polarization lockers to an active configuration comprises:
        configuring the respective polarization splitter to split an optical signal into a first mode and a second mode; and
        configuring the mode converter to convert the second mode into a converted first mode.

3. The photonic interconnect system of claim 2, wherein:
    controlling one of the first and second polarization lockers in the active configuration comprises controlling the phase shifter to align the first mode with the converted first mode and producing an output optical signal comprising a combination of the first mode and the converted first mode.

4. The photonic interconnect system of claim 3, wherein:
    the first and second PICs each comprise a receiver configured to receive the output optical signal and generate a feedback signal; and
    controlling the phase shifter to align the first mode with the converted first mode comprises maximizing the output optical signal using the feedback signal.

5. The photonic interconnect system of claim 3, wherein:
    the first mode is a transverse electric (TE) mode of the optical signal;
    the second mode is a transverse magnetic (TM) mode of the optical signal; and
    the mode converter is a TM-to-TE converter configured to convert the TM mode into a converted TE mode.

6. The photonic interconnect system of claim 1, wherein:
    the optical fiber comprises a first channel and a second channel wherein the first channel is configured to transmit an optical signal in a first direction and the second channel is configured to transmit the optical signal in a second direction.

7. The photonic interconnect system of claim 6, wherein:
    controlling the first and second polarization lockers comprises determining which of the first or second directions the optical signal is being carried.

8. The photonic interconnect system of claim 7, wherein:
    the first polarization locker is set to the active configuration when the optical signal is being transmitted in the first direction; and
    the second polarization locker is set to the active configuration when the optical signal is being transmitted in the second direction.

9. The photonic interconnect system of claim 1, wherein:
    each of the first and second PICs are coupled to a respective application-specific integrated circuit (ASIC).

10. The photonic interconnect system of claim 9, wherein:
    each of the respective ASICs comprise:
        a die-to-die (D2D) interface comprising a plurality of wires;
        a plurality of SerDes coupled to the plurality of wires;
        a plurality of optical modulators coupled to a first subset of the plurality of SerDes;

a plurality of optical detectors coupled to a second subset of the plurality of SerDes;

wherein the first and second PICs are coupled to the respective ASICs by coupling the each of the first and second polarization lockers to one of the plurality of optical modulators and one of the plurality of optical detectors on their respective ASIC.

11. The photonic interconnect system of claim 10, wherein:

the D2D interface of the respective ASICs comprise Advanced interface Bus (AIB) interfaces.

12. The photonic interconnect system of claim 10, wherein:

the D2D interfaces of the respective ASICs comprise Universal Chiplet Interconnect Express (UCIe) interfaces.

13. The photonic interconnect system of claim 10, wherein:

a distance between the D2D interfaces of the respective ASICs is greater than 2.5 cm.

14. A method for the photonic interconnection of photonic integrated circuits (PIC), the method comprising:

transmitting through an optical fiber, an optical signal between a first PIC comprising a first polarization locker and a second PIC comprising a second polarization locker; and controlling, using control circuitry, the first and second polarization lockers by setting one of the first and second polarization lockers to an active configuration while setting the other of the first and second polarization lockers to a passive configuration.

15. The method of claim 14, the method further comprising:

with the polarization locker set to the active configuration:

splitting, with a polarization locker, the optical signal into a first mode and a second mode;

converting, with a mode converter, the second mode into a converted first mode; and aligning, with a phase shifter, the first mode and the converted first mode.

16. The method of claim 15, wherein:

controlling the first and second polarization lockers comprises controlling the phase shifter of the polarization locker set to the active configuration to maximize an output optical signal.

17. The method of claim 16, wherein:

controlling the phase shifter to maximize the output optical signal comprises:

determining a photocurrent of a receiver caused by the output optical signal;

receiving a feedback signal indicative of the photocurrent; and adjusting the phase shifter using the feedback signal.

18. The method of claim 15, wherein:

the first mode is a transverse electric (TE) mode;

the second mode is a transverse magnetic (TM) mode; and the mode converter is a TM-to-TE converter for converting the TM mode into a converted TE mode.

19. The method of claim 14, wherein:

setting one of the first and second polarization lockers to an active configuration comprises:

determining a direction of the optical signal; and setting the first polarization locker to the active configuration when the direction of the optical signal is the first direction and setting the second polarization locker to the active configuration when the direction of the optical signal is the second direction.

* * * * *